(12) United States Patent
Su

(10) Patent No.: US 11,238,569 B2
(45) Date of Patent: Feb. 1, 2022

(54) IMAGE PROCESSING METHOD AND APPARATUS, IMAGE DEVICE, AND STORAGE MEDIUM

(71) Applicant: BEIJING SENSETIME TECHNOLOGY DEVELOPMENT CO., LTD., Beijing (CN)

(72) Inventor: Liu Su, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/914,637

(22) Filed: Jun. 29, 2020

(65) Prior Publication Data
US 2020/0327647 A1 Oct. 15, 2020

Related U.S. Application Data

(63) Continuation of application No. PCT/CN2019/124515, filed on Dec. 11, 2019.

(30) Foreign Application Priority Data

Mar. 6, 2019 (CN) .......................... 201910169460.X

(51) Int. Cl.
*G06T 5/00* (2006.01)
*G06T 7/70* (2017.01)
*G06K 9/00* (2006.01)

(52) U.S. Cl.
CPC .......... *G06T 5/005* (2013.01); *G06K 9/00281* (2013.01); *G06T 5/008* (2013.01); *G06T 7/70* (2017.01); *G06T 2207/10024* (2013.01); *G06T 2207/30201* (2013.01)

(58) Field of Classification Search
CPC .......... G06T 5/005; G06T 7/70; G06T 5/008; G06T 2207/10024; G06T 2207/30201; G06T 11/60; G06K 9/00281
USPC .......................................................... 382/274
See application file for complete search history.

(56) References Cited

U.S. PATENT DOCUMENTS

2009/0225099 A1 9/2009 Mayumi

FOREIGN PATENT DOCUMENTS

| CN | 103236066 A | 8/2013 | |
|---|---|---|---|
| CN | 107305622 A | 10/2017 | |
| CN | 108230331 A | 6/2018 | |
| CN | 108734070 A * | 11/2018 | ............. G06T 11/00 |
| CN | 108734070 A | 11/2018 | |
| CN | 108876731 A * | 11/2018 | |

(Continued)

OTHER PUBLICATIONS

International Search Report in the international application No. PCT/CN2019/124515, dated Mar. 16, 2020, 2 pgs.

(Continued)

*Primary Examiner* — Amandeep Saini
(74) *Attorney, Agent, or Firm* — Cooper Legal Group, LLC

(57) ABSTRACT

An image processing method and apparatus, an image device, and a storage medium are provided. The method includes: detecting key points of a first face image; determining a target region for malar fat pad region adjustment based on the key points; determining an adjustment parameter for a malar fat pad region based on the key points; and adjusting the target region based on the adjustment parameter to form a second face image.

17 Claims, 5 Drawing Sheets

(56) References Cited

FOREIGN PATENT DOCUMENTS

| | | | |
|---|---|---|---|
| CN | 108876731 | A | 11/2018 |
| CN | 108986019 | A | 12/2018 |
| CN | 109376671 | A | 2/2019 |
| CN | 109376684 | A | 2/2019 |
| CN | 109377446 | A | 2/2019 |
| CN | 109949237 | A | 6/2019 |
| JP | 2007193729 | A | 8/2007 |
| JP | 2007193730 | A | 8/2007 |
| KR | 20100047863 | A | 5/2010 |
| WO | 2018221092 | A1 | 12/2018 |

OTHER PUBLICATIONS

First Office Action of the Chinese application No. 201910169460.X, dated Aug. 5, 2020, 34 pgs.
"Enter the Magical World of 3D Printing", Jul. 2021, Jia Yibin,etc., Three Stage Example, vol. 1-34, 4 pgs.
First Office Action of the Japanese application No. 2020-535619, dated Aug. 24, 2021, 8 pgs.
First Office Action of the Korean application No. 10-2020-7019432, dated Oct. 18, 2021, 91 pgs.

\* cited by examiner

IMAGE PROCESSING METHOD AND APPARATUS, IMAGE DEVICE, AND STORAGE MEDIUM

CROSS-REFERENCE TO RELATED APPLICATIONS

The present disclosure is a U.S. continuation application of International Application No. PCT/CN2019/124515, filed on Dec. 11, 2019, which claims priority to Chinese Application No. 201910169460.X, filed with the Chinese Patent Office on Mar. 6, 2019 and entitled "IMAGE PROCESSING METHOD AND APPARATUS, IMAGE DEVICE, AND STORAGE MEDIUM". The contents of International Application No. PCT/CN2019/124515 and Chinese Application No. 201910169460.X are incorporated herein by reference in their entireties.

BACKGROUND

Mobile phones, tablet computers, or wearable devices, etc. are generally equipped with cameras, which can acquire images. However, images acquired are not always ideal images desired by users and may need to be adjusted so that the images presented satisfy users' expectations, for example, making the images beautiful, funny, or cute. Taking face image processing as an example, the processing of face images in the related art is generally limited to the processing of the eyes, the nose, and the face shape, but the processing such as beautification of other parts is relatively less. Therefore, the image processing technology in the related art is not optimized and perfect enough, and the image processing effect has not yet reached an ideal expected effect.

SUMMARY

The present application relates to the field of computer technologies, and in particular, to an image processing method and apparatus, an image device, and a storage medium.

In view of this, embodiments of the present disclosure provide an image processing method and apparatus, an image device, and a storage medium.

According to a first aspect, provided is an image processing method. The method includes:

detecting key points of a first face image;

determining a target region for malar fat pad region adjustment based on the key points;

determining an adjustment parameter for a malar fat pad region based on the key points; and adjusting the target region based on the adjustment parameter to form a second face image.

According to a second aspect, provided is an image processing apparatus, including:

a detecting unit, configured to detect key points of a first face image;

a first determining unit, configured to determine a target region for malar fat pad region adjustment based on the key points;

a second determining unit, configured to determine an adjustment parameter for a malar fat pad region based on the key points; and an adjusting unit, configured to adjust the target region based on the adjustment parameter to form a second face image.

According to a third aspect, provided is an image device, including:

a memory, configured to store computer executable instructions; and a processor, connected to the memory and when the computer executable instructions are executed by the processor, the processor is configured to implement the first aspect.

A computer storage medium is provided, having computer executable instructions stored thereon, where the computer executable instructions are executed to by a processor implement the foregoing first aspect.

BRIEF DESCRIPTION OF DRAWINGS

In the technical solutions provided in the embodiments of the present disclosure, key points in a first face image are obtained by performing key point detection on the first face image, then a target region where a malar fat pad region is located in the first face image is determined according to the key points, an adjustment parameter for adjusting the malar fat pad region in the first face image is determined based on the key points, and the target region is adjusted by using the adjustment parameter, so as to generate a second face image in which the malar fat pad region is adjusted. Therefore, the technical solutions provided in the embodiments of the present disclosure provide at least a function of adjusting a malar fat pad region in a face image to enable adjustment of the malar fat pad region in the face image according to user requirements subsequently, thereby improving the beautification or funny distortion effect of the face image.

To describe the technical solutions in embodiments of the present application or the background art more clearly, the accompanying drawings required for describing the embodiments of the present application or the background art are described below.

The accompanying drawings here are incorporated into the description and constitute a part of the description. These accompanying drawings show embodiments that conform to the present disclosure, and are intended to describe the technical solutions in the present disclosure together with the description.

Figure 1:
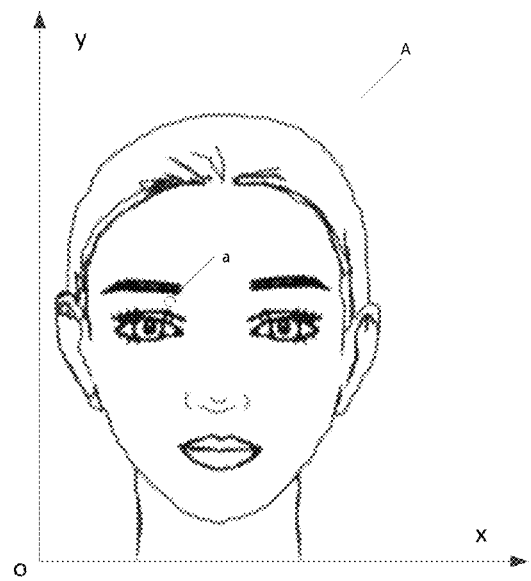
Figure 2:
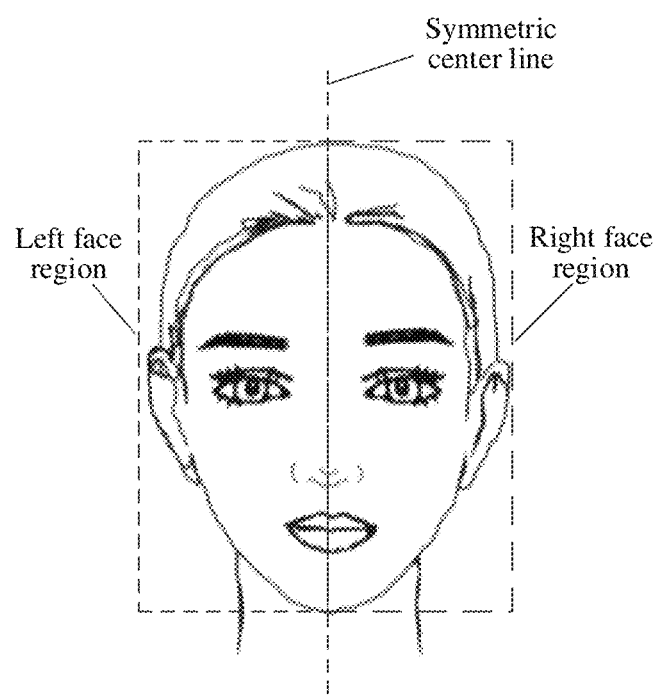
Figure 3:
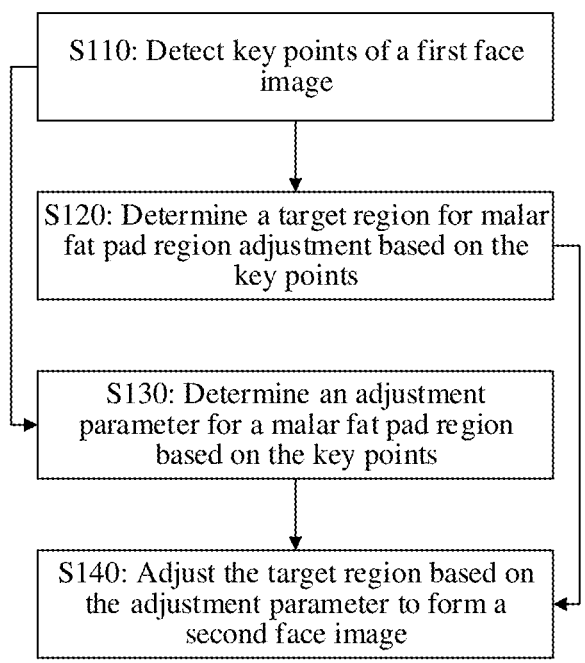
Figure 4:
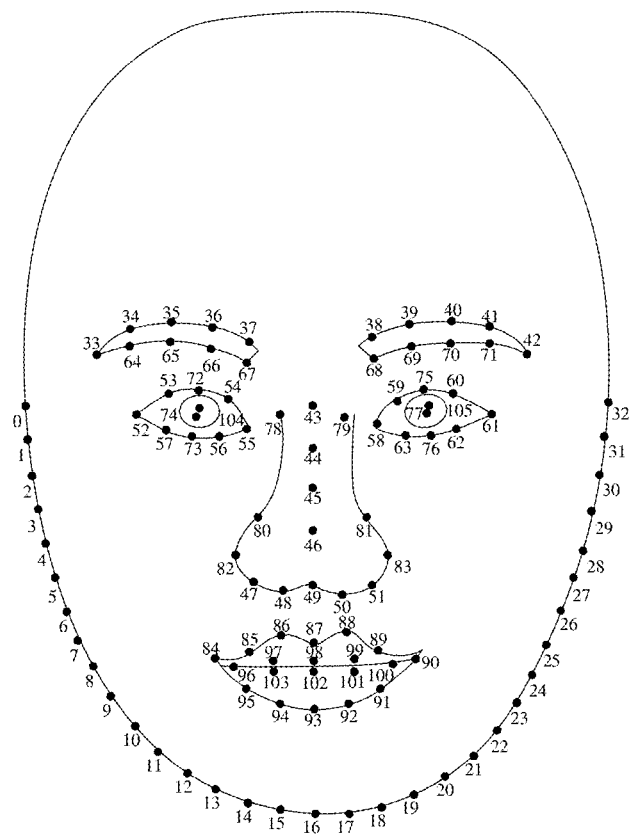
Figure 5:
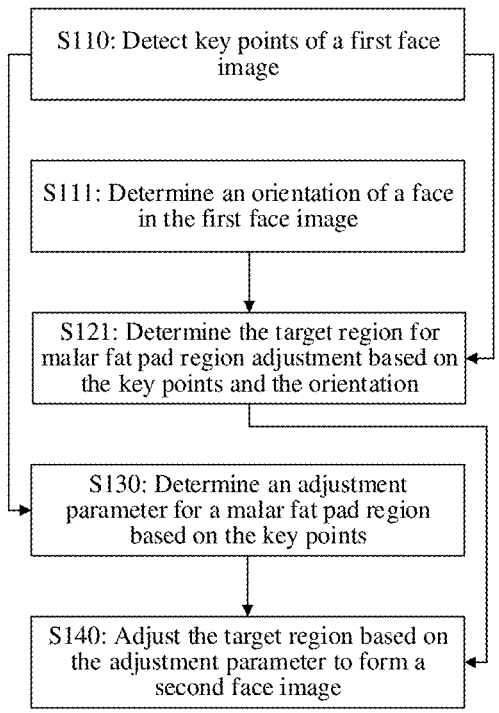
Figure 6A:
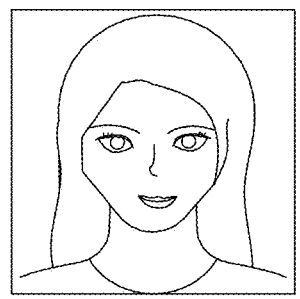
Figure 6B:
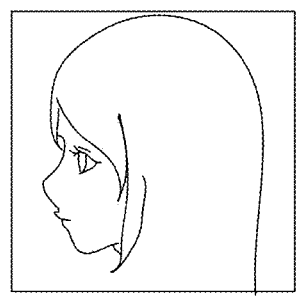
Figure 6C:
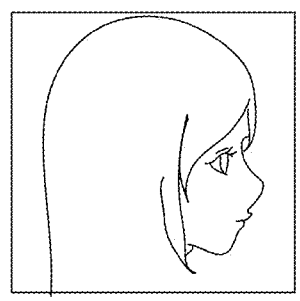
Figure 7:
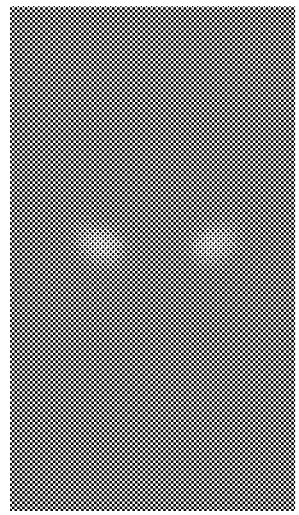
Figure 8:
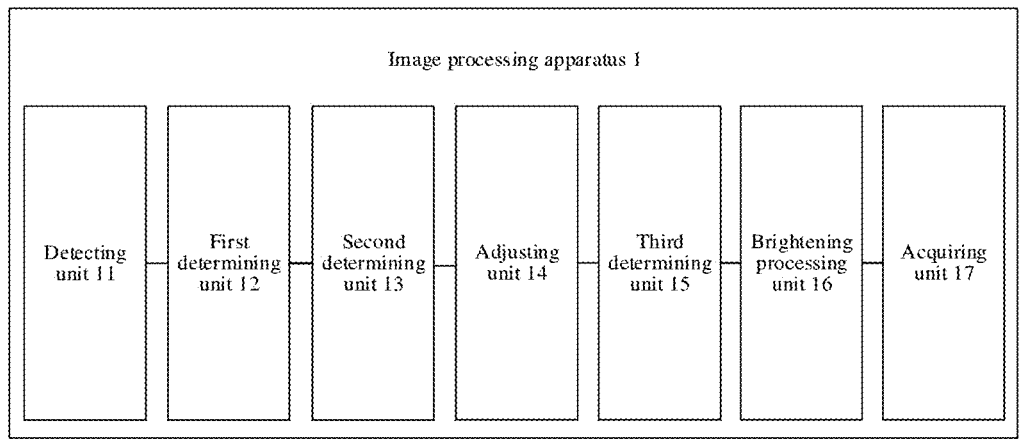
Figure 9:
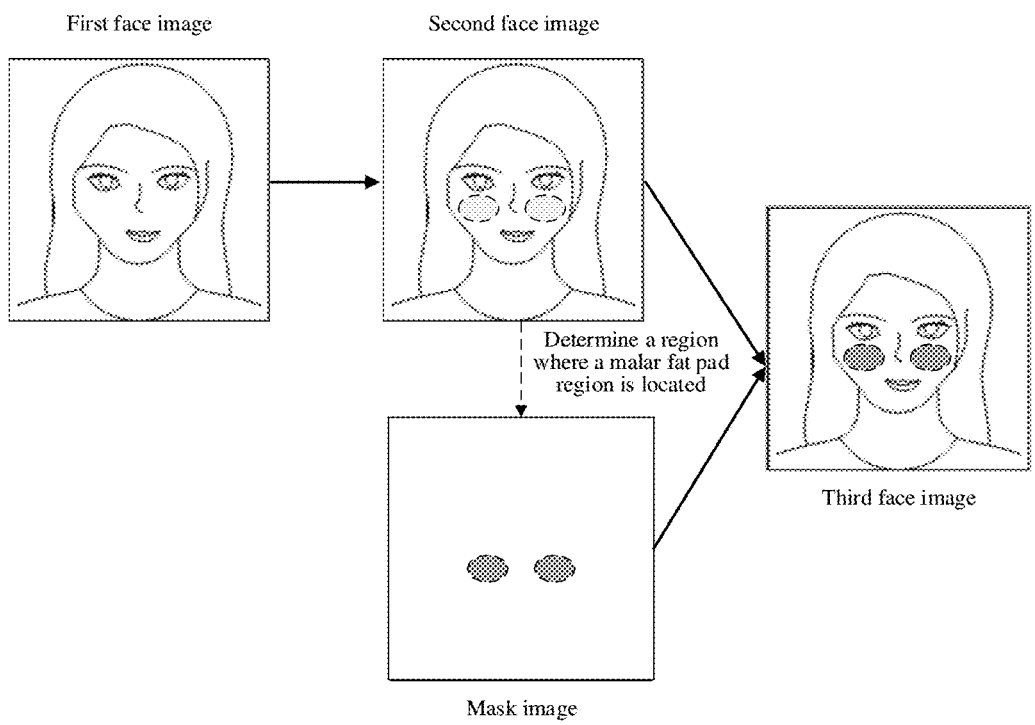
Figure 10:
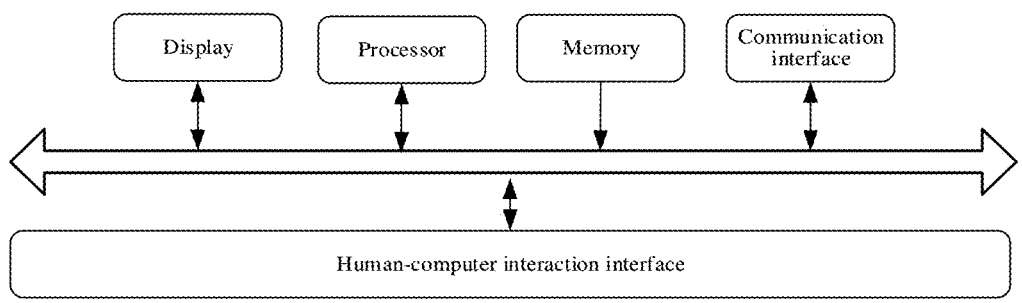

FIG. 1 is a schematic diagram of a pixel coordinate system provided by the embodiments of the present disclosure;

FIG. 2 is a schematic diagram of a region division of a face image provided by the embodiments of the present disclosure;

FIG. 3 is a schematic flowchart of an image processing method provided by the embodiments of the present disclosure;

FIG. 4 is a schematic diagram of face key points provided by the embodiments of the present disclosure;

FIG. 5 is a schematic flowchart of another image processing method provided by the embodiments of the present disclosure;

FIG. 6A is a schematic diagram of an effect of a frontal face image provided by the embodiments of the present disclosure;

FIG. 6B is a schematic diagram of an effect of a side face image provided by the embodiments of the present disclosure;

FIG. 6C is a schematic diagram of an effect of another side face image provided by the embodiments of the present disclosure;

FIG. 7 is a schematic diagram of an effect of a masks image provided by the embodiments of the present disclosure;

FIG. 8 is a schematic structural diagram of an image processing apparatus provided by the embodiments of the present disclosure;

FIG. 9 is a schematic structural diagram of an image device according to the embodiments of the present disclosure;

FIG. 10 is a schematic diagram of an effect of an image processing method provided by the embodiments of the present disclosure.

DETAILED DESCRIPTION

The technical solutions of the present disclosure are further described in details below with reference to the accompanying drawings of the description and detailed embodiments.

Before the following descriptions, a pixel coordinate system in embodiments of the present disclosure is first defined. As shown in FIG. 1, a pixel coordinate system xoy is constructed by taking a lower right corner of a face image A as the origin o of the pixel coordinate system, a direction parallel to a row of the face image A as an x-axis direction, and a direction parallel to a column of the face image A as a y-axis direction. In the pixel coordinate system, an abscissa is used to represent a column number in the face image A of a pixel in the face image A, an ordinate is used to represent a row number in the face image A of a pixel in the face image A, and the unit of both the abscissa and the ordinate may be pixel. For example, assuming that coordinates of a pixel a in FIG. 1 is (10, 30), the abscissa of the pixel a is 10 pixels, the ordinate of the pixel a is 30 pixels, and the pixel a is a pixel in the $10^{th}$ column and the $30^{th}$ row of the face image A.

For convenience of expression, in the embodiments of the present disclosure, a face region in a face image is divided into a left face region and a right face region. As shown in FIG. 2, a face region is divided into a left face region and a right face region based on a symmetric center line of the face region.

As shown in FIG. 3, the embodiments provide an image processing method, including the following steps.

At step S110, key points of a first face image are detected.

At step S120, a target region for malar fat pad region adjustment is determined based on the key points.

At step S130, an adjustment parameter for a malar fat pad region is determined based on the key points.

At step S140, the target region is adjusted based on the adjustment parameter to form a second face image.

In the embodiments, a malar fat pad region in a human face may be understood as a region where an inverted triangular tissue is located in a region below the eye. When a person smiles or makes a facial expression, this region swells slightly due to the compression of facial muscles and looks like a round and glossy apple, and is called a malar fat pad region. The embodiments provide an adjustment solution for a malar fat pad region, which may also be applied to other parts of human faces or facial parts of cartoon characters or facial parts of animals, etc. in practical application. The adjustment of the aforementioned facial parts based on a technical concept of the adjustment solution may be regarded as within the technical scope of protection of the embodiments of the present disclosure.

In step S110, a deep learning model such as a neural network or a face key point detection algorithm is used to process the first face image to determine face key points in the first face image. The face key point detection algorithm may be one of OpenFace, Multi-Task Cascaded Convolutional Networks (MTCNN), Tweaked Convolutional Neural Networks (TCNN), or Tasks-Constrained Deep Convolutional Network (TCDCN). No limitation is made to the face key point detection algorithm in the present disclosure.

For example, the key points include, but are not limited to, the following key points:

face contour key points, for example, key points 0 to 32 shown in FIG. 4;

eyebrow key points, for example, key points 33 to 37, key points 38 to 42, and key points 64 to 71 in FIG. 4;

eye key points;

nose key points; and lip key points, etc., for the lip key points, see key points 84 to 103 in FIG. 4.

According to the distribution of the key points on the eye, the eye key points may include:

inner eye corner key points located at inner eye corners, for example, key points 55 and 58 shown in FIG. 4;

outer eye corner key points located at outer eye corners, for example, key points 52 and 61 shown in FIG. 4;

upper eyelid key points located on upper eyelids, for example, key points 53, 72, and 54 and key points 59, 75, and 60 shown in FIG. 4;

lower eyelid key points located on lower eyelids, for example, key points 62, 76, and 63 and key points 57, 73, and 56 shown in FIG. 4; and eyeball key points located in eyeballs, for example, key points 74 and 104 and key points 77 and 105 shown in FIG. 4.

According to the distribution of the key points on the nose, the nose key points may be divided into:

a key point located at radix nasi, for example, key point 43 shown in FIG. 4;

nose bridge key points located on a nose bridge, for example, key points 44 and 45 in FIG. 4;

nosewing key points located on nosewings, for example, key points 80 to 83 in FIG. 4;

a nose tip key point located on a nose tip, for example, key point 46 in FIG. 4; and nasal floor key points located on a nasal floor, for example, key points 47 to 51 in FIG. 4.

In the embodiments, the key point related to malar fat pad region adjustment includes at least one of the following:

key points 4, 5, 28, and 27 near the positions of the cheekbones in the face contour key points shown in FIG. 4;

outer eye corner key points; and inner eye corner key points.

In step S130, first, according to one or more of the key points, a target region for malar fat pad region adjustment is delineated in the first face image. After the region is delineated, malar fat pad region adjustment may be implemented according to pixels in the region. In specific implementation, a first face contour key point and/or a second face contour key point may be selected from the aforementioned face contour key points, so as to determine an adjustment parameter for the malar fat pad region.

In the embodiments, the target region may be a circular region or an elliptical region.

In step S130, an adjustment parameter for the malar fat pad region is determined according to one or more of the key points. The adjustment parameter for the malar fat pad region includes, but is not limited to, at least one of the following:

one or more adjustment directions of the malar fat pad region;

an adjustment amplitude of the malar fat pad region; and an adjustment gradient of the malar fat pad region.

The one or more adjustment directions may be used for determining a movement direction of the malar fat pad region on the first face image.

The adjustment amplitude may be used for determining a change in dimension of the malar fat pad region on the first face image, for example, a movement distance or a scale ratio.

The adjustment gradient may be used for determining an adjustment amplitude difference between different adjustments during multiple adjustments, or determining an adjustment amplitude difference between different regions when adjusting the malar fat pad region by region. For example, the circular or elliptical target region is divided into an inner region and an outer region. The outer region is surrounded by the inner region. When adjusting the brightness of the malar fat pad region, the brightness adjustment amplitude of the inner region is greater than that of the outer region. The difference in the adjustment brightness between the inner and outer regions constitutes the adjustment gradient. Of course, this is only an example, and there are many specific implementations.

In step S130, the key points for determining the adjustment parameter and the target region may be the same or different. In some embodiments, the key points for determining the adjustment parameter and the target region may be partially the same. For example, the same face contour key points may be used for determining the adjustment parameter and the target region. For another example, the same eye key points may be used for determining both the adjustment parameter and the target region.

In step S140, at least one of the position, shape, size, or color of the target region in the first face image is adjusted according to the adjustment parameter so as to form the second face image.

Specifically, the step S140 may include at least one of the following:

moving the target region to adjust the position of the target region;

performing size scaling on the target region to adjust the size of the target region on the second face image;

performing color transformation on the target region to adjust the color of the target region to form a highlight or a shadow region on the face; and performing shape change on the target region to adjust the presented shape of the target region, so that a malar fat pad region shape that matches the shape of the face is imaged. For example, different face shapes are imaged in different face images, for example, some are egg-shaped faces, some are heart-shaped faces, some are round faces, and some are diamond faces. The shape of a malar fat pad region is generally approximately an inverted triangle; however, different angles of the three corners of or different positions of vertices of the triangle on a face image would result in different visual feelings for the malar fat pad region. Therefore, in some embodiments, an image device may also, for example, adjust the positions of pixels in the target region to make the malar fat pad region shown in inverted triangles of different shapes in the target region, or in the target region after movement, to match the face shape, thereby achieving beautification or funny distortion processing of face images.

In short, the embodiments provide a method to adjust a malar fat pad region in a face image, so as to achieve a beautiful, funny, or cute malar fat pad region, or different styles of the malar fat pad region in the face image, such that malar fat pad region processing of images may be implemented according to user requirements, thereby satisfying different user demands on images and improving user experience and image processing quality.

In some embodiments, when the adjustment parameter is generated in step S130, the adjustment parameter may be generated according to an expected adjustment effect of a current malar fat pad region. For example, if the current expected adjustment effect is a malar fat pad region beautification effect, the malar fat pad region presents a popular aesthetic beautification effect on the second face image with respect to the first face image according to the beautification effect. For another example, if the current expected adjustment effect is a funny distortion effect to present a humorous effect through the adjustment of the malar fat pad region on the first face image, when generating the adjustment parameter, the key points and the funny distortion effect are combined to generate a malar fat pad region that makes the second face image present a humorous and funny effect. In short, in some embodiments, the generation of the adjustment parameter is also determined according to an expected adjustment effect.

In the embodiments, the adjustment of malar fat pad region may be used in an image beautification process, and in an application for image beautification, the malar fat pad region adjustment provided by the embodiments of the present disclosure may be used in a one-click face image beautification, such that malar fat pad region beautification, together with eye beautification, nose beautification or face shape beautification, etc., is implemented as one function of one-click face image beautification.

Of course, the adjustment of malar fat pad region provided by the embodiments may also be used in a special malar fat pad region beautification function. For example, a malar fat pad region beautification control is provided in an image beautification application. If an operation of a user acting on the malar fat pad region beautification control is detected, the malar fat pad region in the image is separately beautified using the method above.

In short, the image processing method described in the embodiments has a malar fat pad region adjustment function to perform malar fat pad region adjustment during face image processing, thereby satisfying the user requirements for malar fat pad region adjustment and improving the user experience and the intelligence of an image device.

In some other embodiments, as shown in FIG. 5, the method includes the following steps.

At step S111, an orientation of a face in the first face image is determined.

The step S120 may include step S121; and the step S121 may include: determining the target region for malar fat pad region adjustment based on the key points and the orientation.

In the embodiments, the orientation of the first face image is also determined. The orientation of the first face image includes at least two types:

a first type: a frontal face orientation, which means that the first face image is a frontal face image; and a second type: a side face orientation, which means that the first face image is a side face image.

When an angle between a photography direction of an imaging device that acquires the first face image and a symmetric center line of the face region of a photographed person (hereinafter referred to as a face deflection angle) is within a first predetermined range, the orientation of the first face image is a frontal face orientation.

The aforementioned face deflection angle refers to an angle between the photography direction of the imaging device and a vertical line of the face region of the photographed person; when viewing from the top of the head of the photographed person to bottom, the face deflection angle is positive if the offset direction of the photography direction of the imaging device with respect to the symmetric center line of the face region of the photographed person is clockwise; otherwise, when viewing from the top of the head of the photographed person to bottom, the face deflection angle is negative if the offset direction of the photography direction of the imaging device with respect to the symmetric center line of the face region of the photographed person is anticlockwise.

When the face deflection angle of the first face image is within a second predetermined range, the orientation of the first face image is a side face orientation.

The first predetermined range and the second predetermined range are complementary sets with respect to each other. For example, if the first predetermined range is −10 degrees to 10 degrees, the second predetermined range is −180 degrees to −10 degrees, and 10 degrees to 180 degrees.

Orientations other than the frontal face orientation in face images may be regarded as side face orientations, of course, except for a back image which does not include a face.

FIG. 6A is a face image in a frontal face orientation; FIG. 6B is a face image in a side face orientation; and FIG. 6C is a face image in another side face orientation.

In some embodiments, the face deflection angle of the face image shown in FIG. 6A is 0 degree, and it is assumed that the face deflection angle of the face image shown in FIG. 6B is −90 degree, and the face deflection angle of the face image shown in FIG. 6C is 90 degrees.

Of course, the first predetermined range and the second predetermined range may be set as needed.

Because a region covered by a malar fat pad region in a face image in a frontal face orientation (hereinafter referred to as the frontal face image) is different from a region covered by a malar fat pad region in a face image in a side face orientation (hereinafter referred to as the side face image) (including different areas of regions covered by the malar fat pad regions, different angles of regions covered by the malar fat pad regions, etc.), the use of the same adjustment standard or adjustment parameter for the frontal face image and the side face image would results an unpleasant adjustment effect of the malar fat pad regions in the face images (for example, the ratio of the area of the adjusted malar fat pad region to the area of the face region is inappropriate, and for another example, the color of the adjusted malar fat pad region and the color of a non-malar fat pad region in the face region are significantly different). Therefore, in the embodiments of the present disclosure, adjustment parameters for face images in different orientations are determined in different ways, so as to improve the adjustment effect of malar fat pad regions in face images.

The following introduces the similarities and differences between a frontal face image and a side face image in determining the target region.

For a frontal face image, the step S120 may include:
if it is determined that the orientation indicates that the first face image is a frontal face image, determining a first intermediate point of the target region based on the first face contour key point and the nosewing key point.

The first face contour key point may be a face contour key point having the ordinate within a first target range, where the first target range is a sum of an ordinate range of a region covered by the malar fat pad region and a third predetermined range. Optionally, the third predetermined range is −5 pixels to 5 pixels. For example, if the maximum value of the ordinates of pixels in the region covered by the malar fat pad region is 35 pixels, the minimum value is 16 pixels, and the third predetermined range is −4 pixels to 5 pixels, a face contour key point having the ordinate greater than or equal to 16−4=12 pixels and less than or equal to 35+5=40 pixels is a first face contour key point.

Optionally, referring to FIG. 4, key point 4 and key point 5 may be used as first face contour key points for adjusting a left malar fat pad region (i.e., the malar fat pad region located in a left face region) in the face image.

In the embodiments, key point 5 is preferably used as the first face contour key point. The nosewing key point is a key point, of which the ordinate has a difference with the ordinate of the first face contour key point within a fourth predetermined range, located in a nosewing region (the region may be defined according to user requirements). For example, assuming that the maximum value of the ordinate of a key point in the first face contour key points is 50 pixels, the minimum value is 40 pixels, and the fourth predetermined range is 10 pixels, the nosewing key point is a nosewing key point having the ordinate within a range of greater than or equal to 30 pixels and less than or equal to 60 pixels.

Optionally, the aforementioned nosewing key point may be key point 80 or key point 82 shown in FIG. 4, and in the embodiments, key point 80 is preferably selected as the nosewing key point. Optionally, if the first face image is a frontal face image, key point 5 and key point 80 shown in FIG. 4 are respectively selected as the first face contour key point and the nosewing key point for adjusting a right malar fat pad region (i.e., a malar fat pad region located in the right face region) to make the adjustment effect satisfy user's expectations. Key point 27 and key point 81 shown in FIG. 4 are selected as the first face contour key point and the nosewing key point for the malar fat pad region of the left face, respectively.

The first intermediate point includes, but is not limited to, the first face contour key points and midpoints of the nosewing key points (such as the midpoint between key point 80 and key point 82 and the midpoint between key point 81 and key point 83 as shown in FIG. 4).

In some embodiments, if facial features of the face presented by the first face image are different, the first intermediate point is obtained after performing position correction based on the first face contour key points and the midpoints of the nosewing key points. For example, if face A is presented in the first face image, it is assumed that a distance between an eyeball key point and a first face contour key point at a corresponding position is a first distance, and it is assumed that a distance from the eyeball key point to the midpoint of nosewing key points at corresponding positions is a second distance. The first face contour key point at the corresponding position above refers to: if the eyeball key point is located in the left face region of the face region, the first face contour key point corresponding to the eyeball key point is a first face contour key point closest to the eyeball key point among first face key points located in the left face region; and if the eyeball key point is located in the right face region of the face region, the first face contour key point corresponding to the eyeball key point is a first face contour key point closest to the eyeball key point among first face contour key points located in the right face region. The midpoint of the nosewing key points at the corresponding positions refers to: if the eyeball key point is located in the left face region of the face region, the midpoint of the nosewing key points corresponding to the eyeball key point is the midpoint of the nosewing key points located in the left face region; and if the eyeball key point is located in the right face region of the face region, the midpoint of the nosewing key points corresponding to the eyeball key point is the midpoint of the nosewing key points located in the right face region.

A correction parameter is generated according to a ratio. If the ratio of the first distance to the second distance is 1, the midpoint of the first face contour key point corresponding to the eyeball key point and the nosewing key point corresponding to the eyeball key point is used as the first intermediate point.

If the ratio of the first distance to the second distance is greater than 1 or less than 1, an offset to a symmetric center line or to a face contour line of the midpoint (hereinafter referred to as a first intermediate point to be confirmed) on a connecting line between the first face contour key point corresponding to the eyeball key point and the nosewing key point corresponding to the eyeball key point may be determined first, where the offset includes a transverse offset and a longitudinal offset. A point determined by the sum of the coordinates of the first intermediate point to be confirmed and the offset is taken as the first intermediate point.

In a possible implementation, if the first distance is not equal to the second distance, the intermediate point to be confirmed may be moved toward the face contour line by the offset; for example, if the eyeball key point and the first face contour key point are both located in the left face region, the transverse offset may be given a negative value to move the first intermediate point to be confirmed toward the face contour line; if both the eyeball key point and the first face contour key point are located in the left face region, the transverse offset may be given a positive value to move the first intermediate point to be confirmed toward the symmetric center line; if the eyeball key point and the first face contour key point are both located in the right face region, the transverse offset may be given a positive value to move the first intermediate point to be confirmed toward the face contour line; and if both the eyeball key point and the first face contour key point are located in the right face region, the transverse offset may be given a negative value to move the first intermediate point to be confirmed toward the symmetric center line.

If the target region is a circular region, the target region may be determined in the face region according to a radius of the target region set by a user and the first intermediate point. In an implementation for determining the radius of the target region, the radius of the target region may be determined according to the area of the face region. In another implementation for determining the radius of the target region, the radius of the target region may also be obtained by estimation by a deep learning model according to the first face image.

Furthermore, the step S120 further includes:

determining the target region based on the first intermediate point and the outer eye corner key point.

In a possible implementation, a linear interpolation algorithm is utilized to calculate the circle radius or a long axis and a short axis of the target region by using the coordinates of the first intermediate point and of the outer eye corner key point in the first face image as known quantities. If the target region is circular, the target region may be constructed by taking the first intermediate point as the center of the circular region and the calculated circle radius of the target region as the radius. If the target region is elliptical, the first intermediate point is the center of the elliptical region, one of the long axis and the short axis is determined, and the other axis is determined based on a predetermined ratio of the long axis to the short axis. If the center, the long axis, and the short axis are all determined, the elliptical target region is certainly determined.

The above is only an example of the linear interpolation algorithm, and the specific implementation is not limited to any of the above.

For the side face image, the step S120 may include:

if it is determined that the orientation indicates that the first face image is a side face image, determining a second intermediate point of the target region based on the second face contour key point and the nosewing key point.

During malar fat pad region adjustment, due to different face orientations, different key points may be selected to determine the target region.

For example, the second face contour key point in the side face image is different from the first face contour key point in the frontal face image. The second face contour key point may be a face contour key point having the ordinate within a second target range, where the second target range is a sum of an ordinate range of a region covered by the malar fat pad region and a fifth predetermined range, and the fifth predetermined range is smaller than the third predetermined range. Optionally, key points 4, 5, 27, and 28 shown in FIG. 4 are all second face contour key points.

In the embodiments, the nosewing key point may be the same as the nosewing key point of the frontal face image, and key point 80 or key point 81 shown in FIG. 4 may be selected.

In the embodiments, the second intermediate point may also be the midpoint of the second face contour key point and the nosewing key point (hereinafter referred to as a second intermediate point to be confirmed), or the second intermediate point may be obtained by moving the second intermediate point to be confirmed in the side face image by referring to the mode of moving the first intermediate point to be confirmed by using the offset to obtain the first intermediate point in the frontal face image.

The second intermediate point may be a center point of the target region.

Furthermore, the step S120 may further include: determining a range of the target region based on the second intermediate point and the outer eye corner key point.

In the embodiments, from the second intermediate point and the outer eye corner key point, parameters for determining the range, such as the radius of the target region, may also be obtained based on the linear interpolation algorithm, so as to determine the range of the target region on the first face image.

In some embodiments, the step S130 may include:

determining the adjustment parameter for the malar fat pad region based on the key points and the orientation.

In order to achieve optimal adjustment of the malar fat pad region, a specific adjustment parameter may also be determined based on the key points and orientation.

For different orientations, malar fat pad region adjustment strategies may be different. For example, in the adjustment of a frontal face image and the adjustment of a side face image, the adjustment directions and/or angles are different, and the corresponding adjustment strategies are also different. For another example, if the orientations are different, the adjustment brightness of malar fat pad regions is different, and/or the adjustment gradients are different.

Specifically, the step S130 may specifically include: determining the one or more adjustment directions of the malar fat pad region based on the key points and the orientation.

If the orientations are different, the adjustment directions of malar fat pad regions are different.

During image beautification, pull-up or swell adjustment of the malar fat pad region is generally performed, and the specific pull-up directions or the specific swell directions are different due to different face orientations.

In some embodiments, determining the one or more adjustment directions of the malar fat pad region based on the key points and the orientation includes:

if the orientation indicates that the first face image is a frontal face image, determining that the one or more adjustment directions of the malar fat pad region are a first direction based on the key points.

if the orientation indicates that the first face image is a side face image, determining that the one or more adjustment directions of the malar fat pad region are a second direction and a third direction based on the key points, where the third direction is different from the second direction.

In some embodiments, the case that the third direction is different from the second direction includes, but is not limited to, that the third direction is perpendicular to the second direction.

For example, for a side face image, the target region is moved in two directions, where one is to pull up the target region toward the eye, and the other is to move the target region toward the edge of the face. Optionally, the third direction is perpendicular to the second direction.

However, in order to optimize the adjustment effect of the malar fat pad region, in the embodiments, the first direction may be a direction directing from the first intermediate point to the outer eye corner key point; the second direction may be a direction directing from the second intermediate point to the outer eye corner key point; and the third direction may be a direction opposite to the direction directing from the second face contour key point to the nosewing key point (i.e., a direction directing from the nosewing key point to the second face contour key point).

The face contour key point and the outer eye corner key point are detected from the first face image, the distribution thereof reflects the characteristics of the face; therefore, the first direction, the second direction, and the third direction for adjustment determined based on the face contour key point and the outer eye corner key point essentially essentially enable individual adjustments for different faces to achieve optimal adjustment of malar fat pad regions.

Specifically, the step S130 may include:

determining a maximum movement distance of the malar fat pad region based on the outer eye corner key point and an inner eye corner key point.

The distance between the outer eye corner key point and the inner eye corner key point is essentially the length of the eye in the first face image. For example, if the outer eye corner key point and the inner eye corner key point are separated by M pixels, the maximum distance may be M*A pixels. A may be a positive number less than 1. Furthermore, for example, the value of A may be a positive number between 0.44 and 0.74.

In some embodiments, an actual movement distance of the malar fat pad region may be determined based on a user operation. For example, the user inputs a user operation on a human-computer interaction interface, and the actual movement distance is determined according to the user operation. If the movement distance calculated based on the user operation is greater than the maximum movement distance, the maximum movement distance is taken as the actual movement distance of the malar fat pad region to adjust the malar fat pad region.

In some embodiments, the step S130 may include:

if the orientation indicates that the first face image is a side face image, determining an actual movement distance of the malar fat pad region in the side face image according to the face deflection angle and the maximum movement distance.

In the embodiments, the maximum movement distance of the malar fat pad region may be determined based on the key points, where the maximum movement distance is a maximum movement distance of the target region.

In the embodiments, the eye key points are taken as the key points, and the maximum movement distance of the malar fat pad region is determined based on a size of the eye.

In a possible implementation, the aforementioned actual movement distance is positively correlated with the face deflection angle in a side face image. For example, in some embodiments, when the face deflection angle is 90 degrees or −90 degree, the actual movement distance may be the aforementioned maximum movement distance. When the face deflection angle is not equal to 90 degrees and −90 degree, the actual movement distance is equal to the aforementioned maximum movement distance multiplies by a, where a is a positive number less than 1.

Of course, the above is only an example, and there are many specific implementations which are not limited to any of the above.

In some embodiments, the method further includes the following step.

At step S150, brightening processing is performed on a malar fat pad region in the second face image to obtain a third face image.

In the second face image, the malar fat pad region is moved on the face with respect to the first face image. In the embodiments, brightening processing may also be performed the moved malar fat pad region, so that the malar fat pad region looks fuller.

In some embodiments, in the aforementioned brightening processing, degrees of brightening are different for pixels in different positions in the malar fat pad region. For example, the degree of brightening is reduced from the highest point of the malar fat pad region to the periphery of the malar fat pad region in order to make the highest point of the malar fat pad region have the highest brightness, and then the brightness slowly progressively reduced to the same brightness as skin pixels around the malar fat pad region, so that, on the one hand, the malar fat pad region looks more natural after adjustment, and in addition, the brightness difference at different positions of the malar fat pad region presents a stereoscopic effect of the malar fat pad region.

In some embodiments, the method further includes the following steps.

A face skin color parameter is acquired from the second face image.

A brightening parameter for brightening processing of the malar fat pad region is determined based on the face skin color parameter.

Step S150 may include: performing brightening processing on the malar fat pad region in the second face image based on the brightening parameter to obtain the third face image.

One mode is provided in order to reduce the occurrence of unnatural malar fat pad regions after brightening originally dark face images and the occurrence of inapparent brightening effects of malar fat pad regions after brightening face images with originally bright skin color, due to the use of a single brightening parameter to brighten different face images. In the embodiments, a skin color parameter in the face image is acquired, where the skin color parameter includes, but is not limited to, at least one of the following:

A color value of skin pixels in the face image and a color value of skin pixels between the eyes and the lips in the face image, a grayscale histogram of the skin pixels in the face image and the color value of the skin pixels between the eyes and the lips in the face image, the color value of the skin pixels in the face image and the grayscale histogram of the skin pixels between the eyes and the lips in the face image, and the grayscale histogram of the skin pixels in the face image and the grayscale histogram of the skin pixels between the eyes and the lips in the face image.

The average or median brightness of the malar fat pad region and the skin around the malar fat pad region may be determined based on the skin color parameter, so that the brightening parameter for pixels in the malar fat pad region may be determined based on the average or median brightness to distinguish the malar fat pad region from the skin around the malar fat pad region and, in addition, to reduce the difference between the malar fat pad region and the skin around the malar fat pad region.

The brightening parameter includes, but is not limited to, at least one of the following: a brightening amplitude and a brightening ratio.

There are various specific implementations for brightening the malar fat pad region. In the embodiments, a mask image is used for brightening.

In some embodiments, the brightening the malar fat pad region may include:

based on the brightening amplitude, a corresponding brightening amplitude may be added to the original pixel value of the malar fat pad region to obtain a brightened pixel value, and after completing the brightening processing of all pixels in the malar fat pad region, a brightened malar fat pad region may be obtained and the third face image may be obtained.

In some other embodiments, the brightening the malar fat pad region may include:

based on the brightening ratio, the original pixel value of the malar fat pad region may be multiplied by the brightening ratio to obtain a brightened pixel value, and after completing the brightening processing of all pixels in the malar fat pad region, a brightened malar fat pad region may be obtained, and the third face image may be obtained.

In some embodiments, step S150 may include: generating a mask image according to a position of the malar fat pad region in the second face image; and performing brightening processing on the malar fat pad region in the second face image based on the mask image to obtain the third face image.

Step S150 may include:

determining the position of the malar fat pad region in the second face image;

forming a mask image of the same size as the second face image based on the position, where the mask image has a translucent brightening halo at the position in the second face image and is transparent at other positions; and superimposing the mask image on the second face image to generate the third face image.

In this case, the brightness value of the brightening halo in the mask image may directly be the brightness value after the malar fat pad region is brightened; therefore, the brightening parameter may further include: a brightness value after the malar fat pad region is brightened.

FIG. 7 is a schematic diagram of a mask image provided by the embodiments. In FIG. 5, a white halo region is a region that overlaps the region where the adjusted malar fat pad region is located to brighten the malar fat pad region.

Another mode for brightening the malar fat pad region is provided: generating the mask image according to the position of the malar fat pad region in the second face image includes:

generating, according to a predetermined bright spot for brightening the malar fat pad region and the position of the malar fat pad region in the second face image, the mask image including the predetermined bright spot;

and/or performing brightening processing on the malar fat pad region in the second face image based on the mask image to obtain the third face image includes:

mixing a pixel value of a pixel having a pixel value greater than a predetermined threshold in the mask image with a first pixel value of a pixel at a corresponding position in the second face image to obtain a mixed second pixel value; and generating the third face image based on the second pixel value.

In some embodiments, the bright spot of the malar fat pad region may be predetermined, and both a shape and brightness of the bright spot may be predetermined. In this way, the generation rate of a mask image may be increased.

The position of the bright spot of the malar fat pad region in the mask image corresponds to the position of the malar fat pad region in the second face image. For example, key points are detected in the first face image; because the first face image and the second face image are changed in only the malar fat pad region, but the change is still within the range of the face and is not a great movement, a region where the malar fat pad region in the second face image is located may be determined according to the key points detected in step S110; for example, according to the target region determined in step S120, or based on the target region and the actual movement distance, the region where the malar fat pad region in the second face image is located is obtained, and the bright spot is correspondingly added to the mask image based on the region.

In the embodiments, in the mask image, the pixel value at the position of the bright spot is greater than the predetermined threshold, and the pixel values of pixels other than that at the position of the bright spot are all less than or equal to the predetermined threshold. Thus, when performing pixel mixing, an operation module suitable for a large amount of operations, such as a Graphic Processing Unit (GPU), may be used to compare pixel values with the predetermined threshold when traversing pixels in the mask image to determine whether the pixels need to be mixed with pixels in the second face image. For example, if the second face image is an RGB image, the second face image includes 3 color channels, and each pixel in the 3 color channels has its corresponding pixel value. If the pixel value of the $M^{th}$ pixel in the mask image is greater than the predetermined threshold, the pixel value of the $M^{th}$ pixel in the mask image is mixed with the color values of the three color channels of the $M^{th}$ pixel in the second face image, and then the mixed values of the 3 color channels are combined to obtain the second pixel value. The mixing here may be linear mixing or non-linear mixing. In the embodiments, the mixing of the mask image and the second face image is preferably non-linear mixing, so that the resulted malar fat pad region has a better brightening effect.

The specific functional relationship of the non-linear mixing may be as follows:

Sqrt(original color)*(a*mask color-1.0)+b*original color*(c-mask color), where "original color" is a first pixel value in the second face image, "mask color" is a pixel value in the mask image, and a, b, c are all known calculation parameters. The specific value may be set as needed.

Sqrt refers to the extraction of square root, and Sqrt (original color) refers to extraction of square root of the first pixel value.

In the embodiments, the value of a and the value of b may be the same. For example, after both "original color" and "mask color" are normalized to values between 0 and 1, the values of a and b may both be 2.0, and the value of c may be 1.0.

In short, the values of a, b, and c may be the same or different.

In some embodiments, normalization processing is performed on pixel values or color values before pixel value mixing, and the obtained pixel values or color values are all data between 0 and 1. In this case, on the one hand, even images formed by color channels having different numbers of bits may also obtain pixel values or color values that are between 0 and 1. On the other hand, through the normalization processing, numerical values involved in the subsequent pixel mixing calculation is greatly reduced, thereby simplifying the calculation.

In some embodiments, the predetermined threshold may be 0.4, 0.45, 0.5, 0.55, 0.6, etc. The value range of the predetermined threshold may be 0.4 to 0.6.

Furthermore, the method further includes: acquiring a control parameter.

Generating the third face image based on the second pixel value includes:

performing linear mixing based on the control parameter, the second pixel value, and the first pixel value to obtain a third pixel value; and generating the third face image based on the third pixel value.

In the embodiments, the control parameter may be an external control parameter received by the image device from a human-computer interaction interface or from other devices, and may be used to control the degree of brightening of the malar fat pad region, and is a control parameter for the degree of brightening of the malar fat pad region.

After obtaining the second pixel value, linear mixing is then performed based on the control parameter and the first pixel value to obtain the third pixel value. For example, the control parameter is a proportional parameter, which may be based on A(RGB1)+RGB2=RGB3. For example, A may be the control parameter; RGB1 may be an an original first pixel value of the second face image; RGB2 may be a mixed second pixel value; and RGB3 may be the third pixel value that forms the third face image after mixture again.

In the embodiments, instead of directly using the second pixel value to generate the third face image, the original second face image and the mixed second pixel value are used to perform linear mixing again to obtain the third face image. In this way, the brightening of the malar fat pad region may be more natural, and the image processing effect is more superior.

It should be understood that the embodiments of the present disclosure describe in detail how to adjust a target region of a malar fat pad region in a face image, and in practical application, a forehead region, a jaw region, a cheekbone region, etc. in a face image may also be adjusted according to the technical solutions provided by the embodiments of the present disclosure.

As shown in FIG. 8, the embodiments provide an image processing apparatus 1, including:

a detecting unit 11, configured to detect key points of a first face image;

a first determining unit 12, configured to determine a target region for malar fat pad region adjustment based on the key points;

a second determining unit 13, configured to determine an adjustment parameter for a malar fat pad region based on the key points; and an adjusting unit 14, configured to adjust the target region based on the adjustment parameter to form a second face image.

In combination with any implementation of the present disclosure, the apparatus 1 further includes:

a third determining unit 15, configured to determine an orientation of a face in the first face image; and the first determining unit 12 is configured to:

determine the target region for malar fat pad region adjustment based on the key points and the orientation.

In combination with any implementation of the present disclosure, the key points include: an outer eye corner key point, a first face contour key point, and a nosewing key point; and the second determining unit 13 is configured to:

if it is determined that the orientation indicates that the first face image is a frontal face image, determine a first intermediate point of the target region based on the first face contour key point and the nosewing key point; and determine the target region based on the first intermediate point and the outer eye corner key point.

In combination with any implementation of the present disclosure, the key points include: an outer eye corner key point, a second face contour key point, and a nosewing key point; and the first determining unit 12 is configured to:

if it is determined that the orientation indicates that the first face image is a side face image, determine a second intermediate point of the target region based on the second face contour key point and the nosewing key point; and determine the target region based on the second intermediate point and the outer eye corner key point.

In combination with any implementation of the present disclosure, the second determining unit 13 is configured to:

determine one or more adjustment directions of the malar fat pad region based on the key points and the orientation.

In combination with any implementation of the present disclosure, the third determining unit 15 is configured to:

if the orientation indicates that the first face image is a frontal face image, determine that the one or more adjustment directions of the malar fat pad region is a first direction based on the key points.

In combination with any implementation of the present disclosure, the third determining unit 15 is further configured to: if the orientation indicates that the first face image is a side face image, determine that the one or more adjustment directions of the malar fat pad region are a second direction and a third direction based on the key points, where the third direction is different from the second direction.

In combination with any implementation of the present disclosure, the first direction is a direction directing to the outer eye corner key point from the first intermediate point of the target region.

In combination with any implementation of the present disclosure, the second direction is a direction directing to the outer eye corner key point from the second intermediate point of the target region. The third direction is a direction directing to the second face contour key point to determine the target region, from the nosewing key point.

In combination with any implementation of the present disclosure, the second determining unit 13 is configured to:

determine an adjustment amplitude of the malar fat pad region based on the key points and the orientation.

In combination with any implementation of the present disclosure, the second determining unit 13 is configured to:

determine a maximum movement distance of the malar fat pad region based on the outer eye corner key point and an inner eye corner key point; and if the orientation indicates that the first face image is a side face image, determine an actual movement distance of the malar fat pad region in the first face image according to a face deflection angle and the maximum movement distance.

In combination with any implementation of the present disclosure, the apparatus 1 further includes:

a brightening processing unit 16, configured to perform brightening processing on a malar fat pad region in the second face image to obtain a third face image.

In combination with any implementation of the present disclosure, the brightening processing unit 16 is configured to:

acquire a face skin color parameter from the second face image;

determine a brightening parameter for brightening processing of the malar fat pad region based on the face skin color parameter; and perform brightening processing on the malar fat pad region in the second face image based on the brightening parameter to obtain the third face image.

In combination with any implementation of the present disclosure, the brightening processing unit 16 is configured to:

generate a mask image according to a position of the malar fat pad region in the second face image; and perform brightening processing on the malar fat pad region in the second face image based on the mask image to obtain the third face image.

In combination with any implementation of the present disclosure, the brightening processing unit 16 is configured to:

generate, according to a predetermined bright spot for brightening the malar fat pad region and the position of the malar fat pad region in the second face image, the mask image including the predetermined bright spot.

In combination with any implementation of the present disclosure, the brightening processing unit 16 is configured to:

mix a pixel value of a pixel having a pixel value greater than a predetermined threshold in the mask image with a first pixel value of a pixel at a corresponding position in the second face image to obtain a mixed second pixel value; and generate the third face image based on the second pixel value.

In combination with any implementation of the present disclosure, the apparatus 1 further includes:

an acquiring unit 17, configured to acquire a control parameter.

The brightening processing unit 16 is configured to:

perform linear mixing based on the control parameter, the second pixel value, and the first pixel value to obtain a third pixel value; and generate the third face image based on the third pixel value.

The following provides two specific examples based on the above embodiments.

Example 1

The malar fat pad region adjustment method may include the following steps:

1) pulling up the malar fat pad region in the first face image;

2) if the first face image is a side face image, in addition to pull-up, expanding this region outwards according to the face deflection angle of the first face image at the same time; and 3) using a mask texture to brighten a region where the malar fat pad region is located.

As shown in FIG. 9, malar fat pad regions are pulled up or laterally expanded in regions where the malar fat pad regions in the first face image are located to obtain the second face image. In FIG. 9, dotted circular regions in the second face image with respect to the first face image may be the target regions where the malar fat pad regions are located; and after combining a second mask image and the second face image, a third face image in which the malar fat pad regions are brightened is obtained.

Example 2

Taking the left face region in the first face image as an example, an example of malar fat pad region adjustment is provided and includes:

I. in the case where the first face image is a frontal face image, pulling up a region in the range of the malar fat pad region in the first face image (corresponding to the aforementioned target region), where 1) a midpoint between key point 5 and key point 80 is calculated as an intermediate point of a pulling region (a circular region), the maximum movement distance of the pulling region is set to be k times the distance between key point 52 and key point 55, k is a positive integer and may be configured based on actual needs;

2) the direction of pull-up is a direction directing from the intermediate point of the pulling region to key point 52 (a target point), and the range (radius) of the pulling region is obtained by linear interpolation from the intermediate point to the target point;

II. if the first face image is a side face image, in addition to pulling up the region where the malar fat pad region is located, expanding this region outwards according to the face deflection angle of the first face image at the same time, where 1) an expansion region may be determined according to the face deflection angle of the first face image, key point 4 is taken as the intermediate point of the expansion region, and the maximum movement distance of the expansion region is the same as the pulling distance and is positively correlated with the face deflection angle;

2) key point 4 is taken as the intermediate point of the expansion region, the expansion direction is opposite to the direction directing from key point 4 to key point 80, and the range (radius) of the expansion region is obtained by linear interpolation from the intermediate point to the target point;

III. using a mask texture to brighten the malar fat pad region, where 1) the brightening processing is performed at last, a mask texture that highlights a malar fat pad region of a standard face is used, and then color mixing with the first face image is performed, so that the malar fat pad region of the face is brightened and looks more stereoscopic.

As shown in FIG. 10, the embodiments provide an image device, including:

a memory;

a processor, connected to the memory and configured to implement the image processing method provided by any of the foregoing technical solutions, such as the image processing method shown in FIG. 1 and/or FIG. 3, by executing computer executable instructions on the memory.

The memory may be various types of memory, such as a Read-Only Memory (ROM), a Random Access Memory (RAM), and a flash memory. The memory may be used for information storage, for example, storing computer executable instructions. The computer executable instructions may be various program instructions, for example, target program instructions and/or source program instructions.

The processor may be various types of processors, for example, a central processor, a microprocessor, a digital signal processor, a programmable array, a digital signal processor, an application specific integrated circuit, or an image processor, etc.

The processor may be connected to the memory by means of a bus. The bus may be an integrated circuit bus, etc.

In some embodiments, the image device may further include: a communication interface, and the communication interface may include: a network interface such as a local area network interface and a transceiver antenna. The communication interface is also connected to the processor and can be used for information transmission and reception.

In some embodiments, the image device further includes a human-computer interaction interface. For example, the human-computer interaction interface may include various input and output devices such as a keyboard and a touch screen.

The embodiments provide a computer storage medium that stores computer executable instructions which are executed to implement the image processing method provided by one or more of the technical solutions applicable to an image device, a database, and a first private network, for example, the image processing method shown in FIG. 1 and/or FIG. 2.

The computer storage medium may include various recording media having a recording function, for example, various storage media such as a CD, a floppy disk, a hard disk, a magnetic tape, an optical disk, a U disk, or a mobile hard disk. Optionally, the computer storage medium may be a non-transitory storage medium, and the computer storage medium may be read by a processor, so that the computer executable instructions stored on the computer storage medium are acquired and executed by a first processor to implement the image processing method provided by any of the foregoing technical solutions, for example, to perform an image processing method applied in an image device or an image processing method applied in an application server.

The embodiments also provide a computer program product that includes computer executable instructions, which are executed to implement the image processing method provided by one or more of the foregoing technical solutions, for example, the image processing method shown in FIG. 3 and/or FIG. 5.

The computer program product includes a computer program tangibly included on a computer storage medium; the computer program includes a program code for executing the method shown in the flowchart; the program code may include corresponding instructions for correspondingly executing steps of the method provided by the embodiments of the present invention.

It should be understood that the disclosed device and method in the embodiments provided in the present disclosure may be implemented by means of other modes. The device embodiments described above are merely exemplary. For example, the unit division is merely logical function division and may be actually implemented by other division modes. For example, a plurality of units or components may be combined or integrated into another system, or some features may be ignored or not performed. In addition, the displayed or discussed mutual couplings or direct couplings or communication connections among the components may be implemented by means of some interfaces. The indirect couplings or communication connections between the devices or units may be implemented in electronic, mechanical, or other forms.

The units described as separate components may or may not be physically separate, and the components displayed as units may or may not be physical units, may be located at one position, or may be distributed on a plurality of network units. A part of or all of the units may be selected according to actual needs to achieve the objectives of the solutions of the embodiments.

In addition, the functional units in the embodiments of the present disclosure may be integrated into one processing module, or each of the units may exist as an independent unit, or two or more of the units are integrated into one unit, and the integrated unit may be implemented in the form of hardware, or may be implemented in the form of a hardware and software functional unit.

A person of ordinary skill in the art may understand that: all or some steps for implementing the forgoing method embodiments may be implemented by a program by instructing related hardware; the foregoing program may be stored in a computer readable storage medium; when the program is executed, steps including the foregoing method embodiments are performed; moreover, the foregoing storage medium includes various media capable of storing program codes such as an ROM, an RAM, a magnetic disk, or an optical disk.

The descriptions above are only specific implementations of the present disclosure. However, the scope of protection of the present disclosure is not limited thereto. Within the technical scope disclosed by the present disclosure, any variation or substitution that can be easily conceived of by those skilled in the art should all fall within the scope of protection of the present disclosure. Therefore, the scope of protection of the present disclosure should be determined by the scope of protection of the appended claims.

The invention claimed is:

1. An image processing method, comprising:
   detecting key points of a first face image;
   determining a target region for malar fat pad region adjustment based on the key points;

determining an adjustment parameter for a malar fat pad region based on the key points;

adjusting the target region based on the adjustment parameter to form a second face image;

generating a mask image according to a position of the malar fat pad region in the second face image; and performing brightening processing on the malar fat pad region in the second face image based on the mask image to obtain a third face image.

2. The method according to claim 1, wherein before determining the target region for malar fat pad region adjustment based on the key points, the method further comprises:

determining an orientation of a face in the first face image; and determining the target region for malar fat pad region adjustment based on the key points comprises:

determining the target region for malar fat pad region adjustment based on the key points and the orientation.

3. The method according to claim 2, wherein the key points comprise: an outer eye corner key point, a first face contour key point, and a nosewing key point; and determining the target region for malar fat pad region adjustment based on the key points and the orientation comprises:

if it is determined that the orientation indicates that the first face image is a frontal face image, determining a first intermediate point of the target region based on the first face contour key point and the nosewing key point; and determining the target region based on the first intermediate point and the outer eye corner key point.

4. The method according to claim 2, wherein the key points comprise an outer eye corner key point, a second face contour key point, and a nosewing key point; and determining the target region for malar fat pad region adjustment based on the key points and the orientation comprises:

if it is determined that the orientation indicates that the first face image is a side face image, determining a second intermediate point of the target region based on the second face contour key point and the nosewing key point; and determining the target region based on the second intermediate point and the outer eye corner key point.

5. The method according to claim 2, wherein determining the adjustment parameter for the malar fat pad region based on the key points comprises:

determining one or more adjustment directions of the malar fat pad region based on the key points and the orientation.

6. The method according to claim 5, wherein determining the one or more adjustment directions of the malar fat pad region based on the key points and the orientation comprises:

if the orientation indicates that the first face image is a frontal face image, determining that the one or more adjustment directions of the malar fat pad region are a first direction based on the key points.

7. The method according to claim 6, wherein the first direction is a direction directing to an outer eye corner key point from a first intermediate point of the target region.

8. The method according to claim 5, wherein determining the one or more adjustment directions of the malar fat pad region based on the key points and the orientation comprises:

if the orientation indicates that the first face image is a side face image, determining that the one or more adjustment directions of the malar fat pad region are a second direction and a third direction based on the key points, wherein the third direction is different from the second direction.

9. The method according to claim 8, wherein the second direction is a direction directing to an outer eye corner key point from a second intermediate point of the target region; and the third direction is a direction directing to a second face contour key point from a nosewing key point.

10. The method according to claim 2, wherein determining the adjustment parameter for the malar fat pad region based on the key points comprises:

determining an adjustment amplitude of the malar fat pad region based on the key points and the orientation.

11. The method according to claim 10, wherein determining the adjustment amplitude of the malar fat pad region based on the key points and the orientation comprises:

determining a maximum movement distance of the malar fat pad region based on an outer eye corner key point and an inner eye corner key point; and if the orientation indicates that the first face image is a side face image, determining an actual movement distance of the malar fat pad region in the first face image according to a face deflection angle and the maximum movement distance.

12. The method according to claim 1, wherein generating the mask image according to the position of the malar fat pad region in the second face image comprises:

generating, according to a predetermined bright spot for brightening the malar fat pad region and the position of the malar fat pad region in the second face image, the mask image comprising the predetermined bright spot.

13. The method according to claim 1, wherein performing brightening processing on the malar fat pad region in the second face image based on the mask image to obtain the third face image comprises:

mixing a pixel value of a pixel having a pixel value greater than a predetermined threshold in the mask image with a first pixel value of a pixel at a corresponding position in the second face image to obtain a mixed second pixel value; and generating the third face image based on the mixed second pixel value.

14. The method according to claim 13, further comprising:

acquiring a control parameter; wherein generating the third face image based on the mixed second pixel value comprises:

performing linear mixing based on the control parameter, the mixed second pixel value, and the first pixel value to obtain a third pixel value; and generating the third face image based on the third pixel value.

15. An image device, comprising:

a memory, configured to store computer executable instructions; and a processor, connected to the memory and when the computer executable instructions are executed by the processor, the processor is configured to:

detect key points of a first face image;

determine a target region for malar fat pad region adjustment based on the key points;

determine an adjustment parameter for a malar fat pad region based on the key points;

adjust the target region based on the adjustment parameter to form a second face image;

generate a mask image according to a position of the malar fat pad region in the second face image; and perform brightening processing on the malar fat pad region in the second face image based on the mask image to obtain a third face image.

16. The image device according to claim 15, wherein the processor is further configured to:

determine an orientation of a face in the first face image; and the processor is specifically configured to:

determine the target region for malar fat pad region adjustment based on the key points and the orientation.

17. A non-transitory computer storage medium, storing computer executable instructions which are executed by a processor to implement the following operations:

detecting key points of a first face image;

determining a target region for malar fat pad region adjustment based on the key points;

determining an adjustment parameter for a malar fat pad region based on the key points;

adjusting the target region based on the adjustment parameter to form a second face image;

generating a mask image according to a position of the malar fat pad region in the second face image; and performing brightening processing on the malar fat pad region in the second face image based on the mask image to obtain a third face image.

* * * * *